May 12, 1970  J. RAWCLIFFE  3,511,077
CALIBRATION OF INSTRUMENTS
Filed April 12, 1968  3 Sheets-Sheet 1

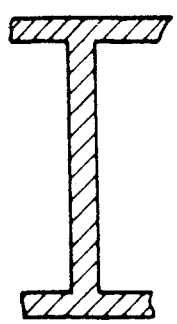 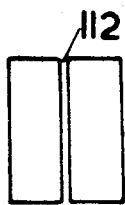 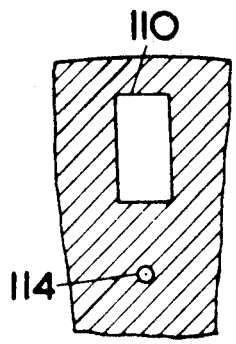 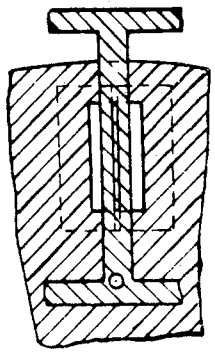
FIG. 2a  FIG. 2b  FIG. 2c  FIG. 2d
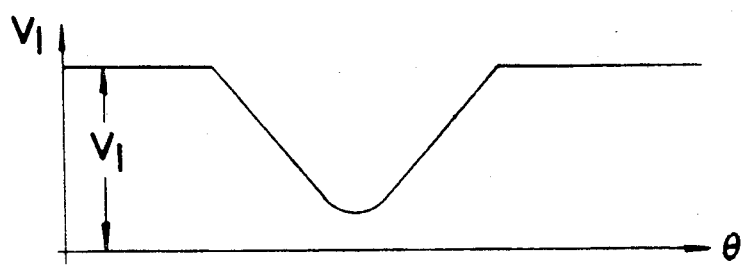
FIG. 3a
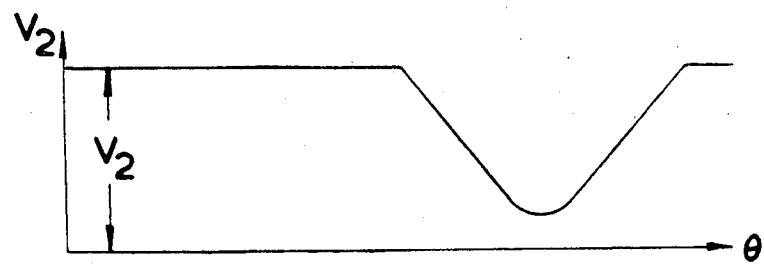
FIG. 3b
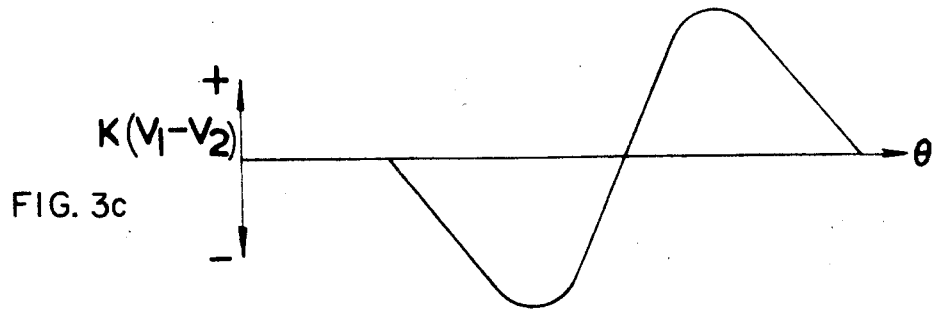
FIG. 3c

United States Patent Office 3,511,077
Patented May 12, 1970

3,511,077
CALIBRATION OF INSTRUMENTS
John Rawcliffe, Pendelbury, England, assignor to Minister of Technology in Her Britannic Majesty's Government of the United Kingdom of Great Britain and Northern Ireland, London, England
Filed Apr. 12, 1968, Ser. No. 720,989
Claims priority, application Great Britain, Apr. 15, 1967, 17,417/67
Int. Cl. G01d *18/00*
U.S. Cl. 73—1             13 Claims

ABSTRACT OF THE DISCLOSURE

Apparatus and process, for automation of the calibration of measuring instruments in which a reading is given by the relative movement of a pointer and scale. Photoelectric means are provided for detecting the reading of the measuring instrument. Servo controlling means, which may embody a computer, control the application and recording of an accurately measurable stimulus to the instrument, and the detection and recording of the corresponding instrument reading produced by the stimulus.

---

This invention relates to the calibration of instruments, more especially indicating instruments of the kind in which a pointer moves with relation to a graduated scale to give a visual reading in response to a stimulus or parameter applied to the instrument.

It has been usual to check the calibration of instruments by applying a known stimulus, under the control of a human operator, who then takes the instrument reading and records the reading and the corresponding stimulus, or the operator varies the stimulus to achieve a certain reading and then records the reading and the corresponding stimulus.

This usual method of claibration requires a skilled operator who must exercise great concentration. This leads to fatigue and liability to error. There is, in any event, a limit to the accuracy and consistency of results that can be achieved by a human operator. It is therefore desirable to eliminate the human factor as far as possible from instrument calibration procedures and cause the procedures to be carried out by automatically operating apparatus.

The invention provides a method and apparatus for calibrating or determining the accuracy of an instrument which involves feeding to the instrument the stimulus it is adapted to measure, monitoring the reading of the instrument by means of a device responsive to the reading, causing a record to be made either of the value of the stimulus or of the reading of the instrument, and comparing the record with a valve corresponding appropriately to the reading of the instrument or to the applied stimulus.

For instruments wherein a visual reading is provided by a pointer which moves with relation to a graduated scale, the said calibration apparatus is provided with a photosensitive device having an element which is arranged to be sensitive to light within a narrow confined area symmetrically positioned about a datum axis and upon which light from the scale and from the pointer can fall so that an output signal from the photo-sensitive device is produced when a scale graduation or the pointer passes through the datum axis whereby coincidence between a scale graduation and the position of the pointer can be detected.

In accordance with the invention, there is provided apparatus for the calibration of a measuring instrument in which a pointer moves over a graduated scale when a stimulus to be measured is applied to the instrument, which apparatus comprises an optical system having an optical axis, driving means for producing relative controlled movement in the direction of the scale between the instrument being calibrated and the axis of the optical system, the optical system being provided with a photosensitive device having an element which is arranged to be sensitive to light within a narrow confined area symmetrically positioned about the optical axis and upon which light from the scale and from the pointer can fall so that a graduation or a pointer output signal from the photo-sensitive device is produced when respectively a scale graduation or the pointer passes through the position in which it is symmetrically disposed about the optical axis, and controlling means for:

(a) Controlling said driving means from the photosensitive device to stop the relative movement between the instrument being calibrated and the optical system of the apparatus when a predecided number of scale output signals have been generated, (b) Varying the stimulus applied to the instrument until the photo-sensitive device produces a pointer output signal as a result of the pointer being symmetrically disposed about the optical axis, and (c) Measuring or recording the magnitude of the stimulus when said pointer output signal is produced.

Preferably, the said controlling means is arranged to stop the relative movement between the instrument being calibrated and the optical system of the apparatus during a predetermined dwell period when each of a predecided series of scale graduations is symmetrically disposed about the optical axis.

In a highly automated form of the calibration apparatus, the controlling means of the apparatus embodies a computer (i.e. data processing apparatus) which may conveniently be an appropriate standard computer unit.

According to an alternative arrangement for determining the reading of the instrument when a predecided precise known value of the stimulus is applied, the said controlling means of the calibration apparatus are replaced by controlling means for (d) Applying a known value of the stimulus to the instrument until the photo-sensitive device produces a pointer output signal as a result of the pointer being symmetrically disposed about the optical axis, (e) Controlling said driving means to stop the relative movement between instrument being calibrated and the optical system of the apparatus when the pointer is symmetrically disposed about the optical axis, and (f) Measuring or recording the scale reading of the instrument by counting the number of scale output signals produced by the photo-sensitive device before the pointer output signal is produced.

Further arrangements may be made if desired to furnish the inter-graduation reading of the pointer beyond the last scale graduation passed as hereinafter described. Alternatively, very small measured increments of the value of the stimulus may be added to the applied known value which stimulates the driving means to cause the instrument to move relatively until a further output signal is produced by the photo-sensitive device.

The photo-sensitive device of the calibration apparatus preferably has a pair of adjacent photo-sensitive elements symmetrically disposed about the optical axis. Additionally, this pair of photo-sensitive elements may be arranged to be responsive only to the graduations on the instrument scale and the photo-sensitive device is provided with a second pair of photo-sensitive elements symmetrically disposed about the optical axis and responsive only to the pointer of the instrument.

As most measuring instruments have circular arc scales, the calibration apparatus normally has means for rotating the instrument to be calibrated. Also in order to facilitate setting up, the apparatus preferably has means for translationally adjusting the position of the instrument to be calibrated.

According to an optional feature of the invention the apparatus comprises adjustable masks apertured to restrict to an appropriate extent the image of the instrument scale and/or pointer projected onto the element or elements of the photo-sensitive device in order to provide a good output signal.

According to a further optional feature of the invention the optical system of the apparatus includes beam splitting means and a viewing screen, whereby a human operator can observe a magnified view of the instrument scale. The optical system may include, coacting with the viewing screen, additional masks of the same general pattern as those coacting with the photo-sensitive device but in which a restricted image of the instrument scale is defined by areas having a greater degree of transparency than the remainder of the mask.

The invention also provides processes which use a calibration apparatus as described above and preferably having one or more of the various features or other provisions described.

In a highly automated form, a process according to the invention for calibrating, by means of a calibration apparatus as above described, a measuring instrument in which a pointer moves over a graduated scale when a stimulus to be measured is applied to the instrument comprises preparing from a selection of scale graduations of the measuring instrument a computer program which can program a computer to actuate the instrument calibration apparatus to record the stimulus required to bring the instrument pointer to each of the selected instrument scale graduations.

According to an optional feature of a process according to the invention an initial record is made of the selected instrument scale graduations from which the computer program can be prepared.

This initial record may be made by a process in which the instrument to be calibrated is mounted on and progressively moved relative to the instrument calibration apparatus, causing a record to be made at the passage of each instrument scale graduation while a human operator causes a further indication to be made on the initial record at the passage of each graduation selected for calibration.

In order that the invention may be more clearly understood by way of example, an instrument calibration apparatus will now be described in detail followed by the procedure by which the calibration of an electrical measuring instrument is carried out by a human operator using the apparatus. The description will be made with reference to the accompanying diagrammatic drawings in which:

FIG. 2(a) is a magnified image of a scale calibration of an instrument to be calibrated;

FIG. 2(b) illustrates adjacent light receptors forming parts of a photo-sensitive device in the calibration apparatus;

FIG. 2(c) illustrates a portion of a mask having in it an aperture for light transmission to the light receptors shown in FIG. 2(b);

FIG. 2(d) shows FIGS. 2(a), (b) and (c) superimposed;

Figure 4:
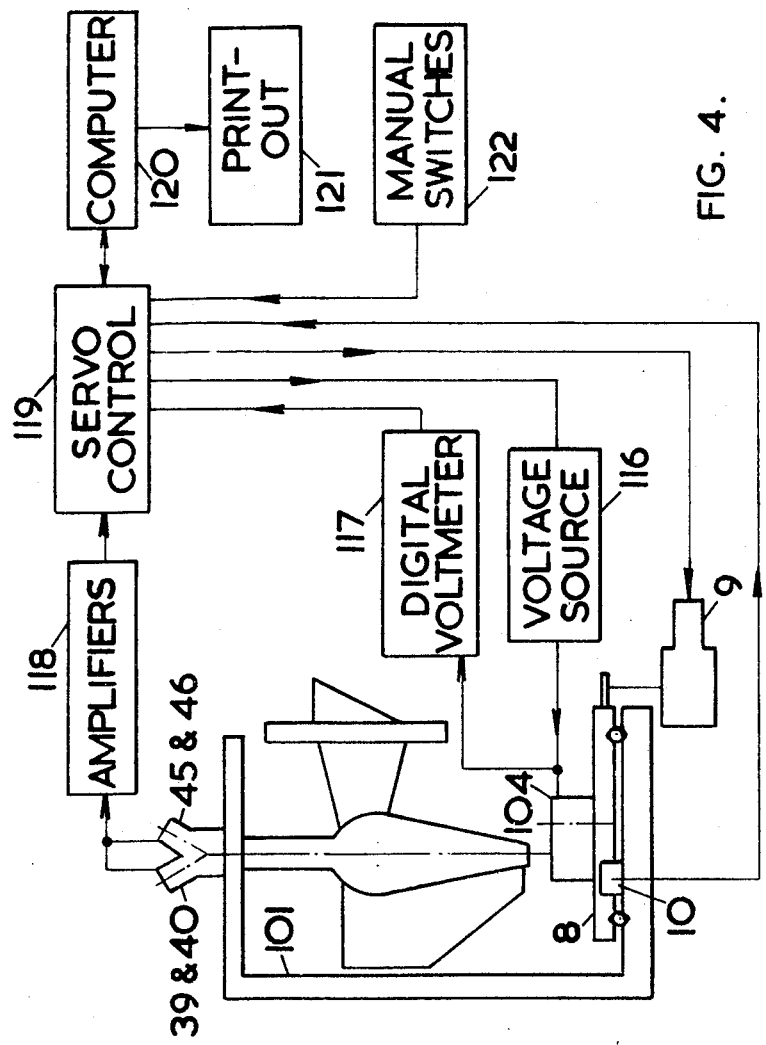

FIG. 3(a) and FIG. 3(b) illustrate individual voltage outputs from two adjacent photo-sensitive elements of a photo-sensitive device;

FIG. 3(c) illustrates a combined output from two adjacent photo-sensitive elements connected differentially;

FIG. 4 is a schematic diagram of the instrument calibration apparatus with ancillary equipment including amplifiers, servo-controls, computer, and instrument supply.

Figure 1:
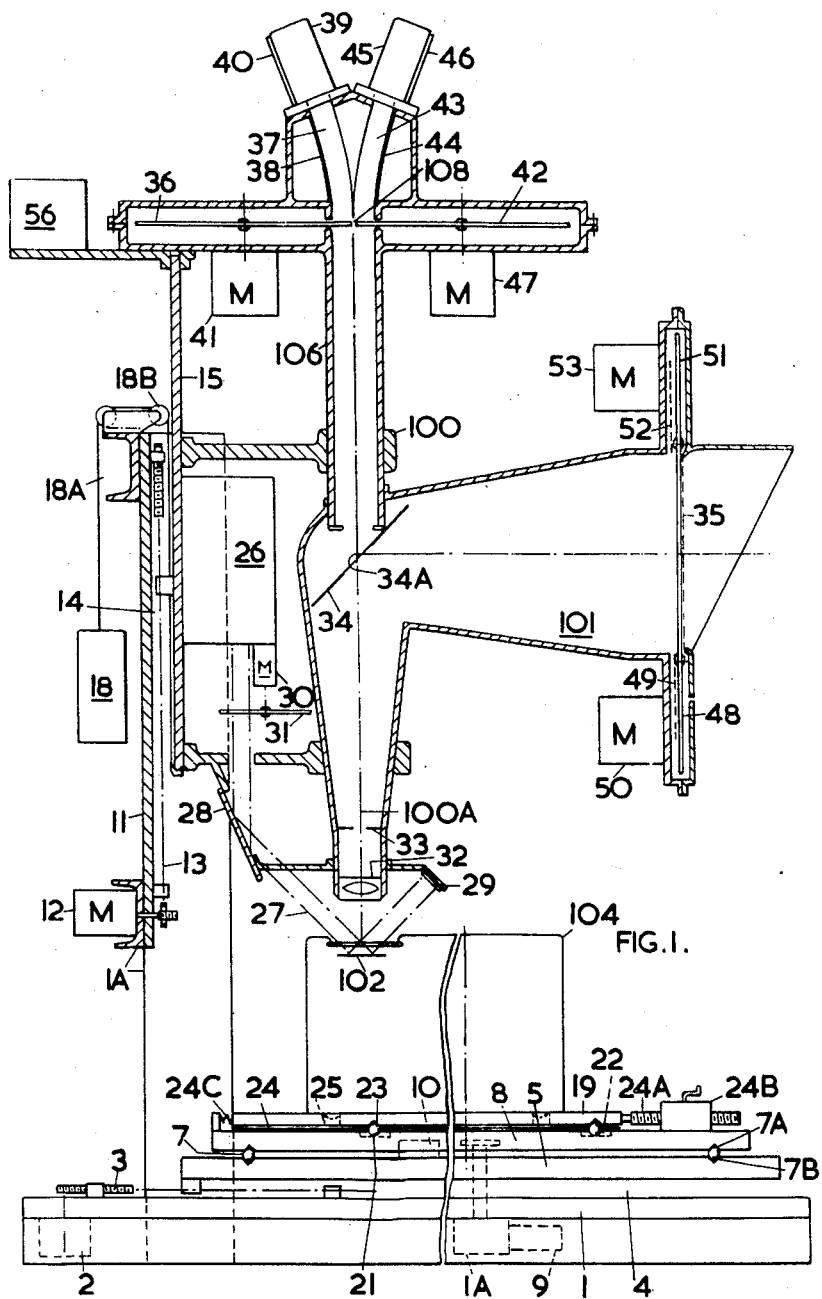
FIG. 1 is a side elevation, in part section, of instrument calibration apparatus according to the invention.

As shown in FIG. 1, the instrument calibration apparatus is desirably supported by a framework of channel section joists, indicated generally by 1A. A substantial base plate, indicated by 1, is supported by the framework. A turntable base 5 is mounted on the base plate 1 through a Kinematic slide indicated diagrammatically by 4, and relative movement along the slide is provided by lead-screw 3, driven by a motor 2. A turntable 8 is rotatably mounted on base 5 by means of spheres 7 engaging with circular, V-section tracks, 7A and 7B in turntable and base respectively. The turntable is rotatable by means of a motor 9, through a gearbox, clutch, brake and friction wheel not separately referenced. The motor is desirably of the split-field, reversible type, suitable for operation under servo control. Rotation of the turntable is monitored by an angle-to-digit transducer 10 driven from the edge of the turntable. This transducer may be of the form usual for conventional machine tool control purposes. A sub-base 19 is provided, to which may be clamped an instrument 104 under test. The sub-base 19 is mounted on the turntable 8 by means of four spheres 21 engaging with grooves 22 in 8 and 23 in 19. Grooves 22 and 23 are at right angles to one another and may be of V-cross section. A sheet of thin metal, 24, between turntable and sub-base has holes through which the spheres 21 extend, and serves as a ball-cage. The sub-base 19 is adjustable over a limited range, with respect to the turntable, in two directions at right angles, by means of lead screws 24A, and gear box and hand-wheel 24B. These are shown for one direction of adjustment only. Backlash is eliminated by the action of springs 24C, one of which only is shown.

Complementary to the turntable 8, and its associated adjustments, is the optical system of the instrument calibration apparatus. This system is indicated generally by the reference 100. The optical axis of the system is indicated by 100A. The whole system 100 is on a vertical plate 15, which is adjustable in a vertical direction, through a Kinematic slide, indicated diagrammatically at 14, in relation to a back plate 11 mounted in turn on the main frame 1A. The bending moment of the overhanging mass of the system 100 is counter balanced by the mass 56. The system is adjustable bodily in a vertical direction by means of a lead screw 13, driven by a reversible motor 12. The weight of the system 100 is counter balanced by the weight of a mass 18, acting on the plate 15 through a cable 18A running over pulleys 18B. The masses 18 and 56 are so proportioned that the centre of gravity of the system 100 together with these masses lies substantially in the line of the Kinematic slide 14.

In the optical system 100 is provided a light source 26, which may desirably be an electric lamp of the quartz-iodine type. To facilitate the design and operation of standard electronic equipment associated with the instrument calibration apparatus, the light from source 26 is chopped by an apertured disc 31 driven by motor 30. The chopping frequency is not highly critical and may be a few hundred per second. Desirably the beam of light 27 from source 26 is collimated. The beam 27 is reflected from a mirror 28, desirably front coated, onto the scale 102 of the instrument 104 under test clamped to sub-base 19. Scattered light is reflected back onto the scale 102 from a conical mirror 29. Light reflected normal to the instrument scale is received by a lens 32, which desirably is a colour corrected projection lens of good quality, having least aberration for on-axis images. From the lens, light passes through the telecentric stop 33 to the 45° mirror 34, the centre section 34A of which is made semi-reflecting. Light is reflected from the mirror 34 onto the ground glass viewing screen 35 in the image plane of lens 32. This enables a magnified image of the portion of the instrument scale 102 immediately below the lens 32 to be presented for visual inspection. Light from lens 32 also passes through the semi-reflecting portion 34A of the mirror and up the tube 106 to form a focused image of the instrument scale at 108. The area on which the image falls is occupied by the plane, polished receptors of four light guides 37, 38 and 43, 44, 38 lying behind 37 and 44 behind 43 as viewed in FIG. 1. The light guides 37, 38, 43 and 44 conduct light to corresponding photo-sensitive elements 39, 40, 45 and 46 respectively. In order to avoid "cross-talk" the light guides are separated from one another by opaque walls, which may be made, for example, of thin metal sheet, as indicated at 112 in FIG. 2b. The term photo senstive device, is herein used for a complete photo-electric sensitive unit provided with one or more photo-sensitive elements and associated amplifiers and appropriate interconnections. Each photo-electric element may be a photo-electric cell of the photo-emissive, photo-conductive or photo-voltaic kind, or a photo-transistor, or desirably a photo-multiplier.

Situated as near as possible to the image plane 108 without touching the light guides 37, 38, 43, 44 are two circular, rotatable masks 36 and 42. The material is opaque and must be thick enough or be adequately ribbed so that the masks do not flex appreciably under their own weight. Each mask has, near the periphery, adjacent to the entry faces of the light guides, a series of apertures of rectangular shape, as illustrated at 110 in FIG. 2(c), but of varying size and proportion to suit different widths and lengths of instrument scale graduation, as further explained below. The masks 36 and 42 are rotatable by means of stepping motors 41 and 47 respectively so that different apertures may be brought into use as required. Corresponding masks 48 and 51 are associated with the viewing screen 35. These masks are made of translucent material and the apertures are represented by areas of different translucency from the rest of the mask or by areas of different colour. Mask 48 is rotatable by stepping motor 50 through transmission 49, and mask 51 is rotatable by stepping motor 53 through transmission 52. Mask 48 is rotatable in phase with mask 36 and 51 in phase with 42. The function of masks 48 and 51 is to show the precise form of image that is presented at 108 to the photo-sensitive elements 39, 40, 45, 46. Associated with each aperture in a mask is a locking hole, indicated at 114 in FIG. 2(c). When an aperture is in the correct position relative to scale graduation image and light guides, as shown at FIG. 2(d), the corresponding locking hole engages with a spring-urged pin (not shown) which ensures that the correct position is maintained. When it is desired to change the aperture, the pin is withdrawn by a magnet coil and only then can the stepping motor be energised to rotate the mask. When the motor is de-energised, so also is the magnet coil, and the pin can again engage a locking hole. The end of the pin may be made conical so as to facilitate entry.

In addition to the device described above, the instrument calibration apparatus makes use of a computer with necessary peripheral and servo control equipment, which items may individually be of conventional design. The computer need not possess great storage capacity, nor need it be capable of a high speed of operation.

A typical arrangement is shown in FIG. 4 wherein the turntable and optical equipment are indicated generally by reference 101 and the other numbered references correspond to those given in FIG. 1. The ancillary apparatus is indicated by boxes, and arrowed lines connecting them indicate the direction of flow of information and commands. The individual boxes have the following significance: 116 is a source of voltage to be applied to the instrument 104 under test; 117 is a voltmeter, e.g. a digital voltmeter to measure accurately the voltage applied to the instrument; 118 represents amplifiers for the output of the photo-sensitive elements 39, 40, 45, 46; 119 represents the control circuits for the calibration apparatus; 120 is a computer with its print-out section 121; and 122 represents the manual switches associated with the apparatus.

The instrument calibration apparatus according to the invention may be applied to any scale and pointer instrument, for example, the calibration apparatus is more especially useful in checking the calibration of electrical instruments of the kind provided with a circular scale over which can move a pivoted pointer. The use of the calibration apparatus will therefore be described, by way of example, in relation to a voltmeter reading up to 100 volts A.C. and having a circular arc scale, using a digital voltmeter as a standard of reference.

The instrument 104 is first secured to the sub-base 19 by means of clamps, not shown, of any suitable kind. Many instruments are fitted with shock-absorbing feet, usually of rubber, which could interfere with the firm clamping of the instrument, and the sub-base 19 is provided with a number of holes 25 into which the feet of an instrument may be placed, the instrument then resting on its back upon the sub-base. Additional holes may be provided in the sub-base to accommodate terminals projecting from the back of an instrument. When the instrument is fixed, the adjustments available for turntable base 5 and sub-base 19 are operated to bring the axis of the instrument pointer into coincidence with the axis of rotation of the turntable, and the instrument scale under the lens 32 so that rotation of the turntable maintains the scale always under the lens. The human operator then sets the instrument pointer accurately to zero. When this has been done, the operator causes the turntable to rotate until the datum line, which is a line corresponding to the mid-line between the receptors of the photo-sensitive elements, as seen on the viewing screen 35, is just clear of the instrument zero on the upscale side. The operator then operates a first switch to cause the turntable to rotate slowly, e.g. at an angular velocity of the order of one or two radians per minute, in order to bring the scale markings into coincidence with the datum line one by one. Due to the inertia of the instrument movement it is found that the pointer lags and does not come into view with the datum line.

As the image of each scale graduation becomes symmetrically disposed in relation to the photo-sensitive elements 45, 46 onto which it is projected by the optical system, the photo-sensitive elements reach a state in which there is an equal low level of illumination in both. The photo-sensitive elements are connected, e.g. differentially, in an electrical circuit. FIG. 3(a) shows how the output of the first photo-sensitive element to be affected by the image of the scale graduation varies with the position of the image in relation to it. FIG. 3(b) shows the same for the second photo-sensitive element and FIG. 3(c) shows the consequent variation of the differential output of the two elements with different positions of the image and which constitutes a scale output signal which passes through zero and changes sign when the image is symmetrically disposed. When this state is reached an oscillator is arranged to be triggered and a brief audible signal is produced. Thus the operator hears a signal as each scale graduation passes the datum line. The operator's duty, at this stage, is to observe the image of the scale on the viewing screen 35 and operate a second switch, for a purpose described below, each time a cardinal scale graduation passes the datum line. The audible signal is not essential but is, nevertheless, of assistance to the operator in consistently performing his action.

In addition to triggering the oscillator, the electrical circuit connected to the photo-sensitive device which produces the scale output signal is arranged to cause a computer to print out a number, increasing by one between successive markings, on a list, each time a scale graduation passes the datum line. Further, when the second switch is operated, the computer is arranged to print a distinguishing mark on the list opposite the number corresponding to the scale graduation which has then just passed the datum line.

When the turntable 8 has turned the instrument so that the last scale graduation has just passed the datum line, the rotation is stopped by a pre-set limit switch, not indicated in the drawings. A list obtained by the operation just described is shown, by way of example, in Table 1 below. The list in the table is a series of integers in one-to-one correspondence with the scale graduations of the instrument under test, excluding the zero, the cardinal graduations being indicated by an asterisk—the distinguishing mark mentioned above. The operator's next duty is to write into the list, opposite the numbers representing the cardinal graduations, the values of the voltages which should be indicated at those graduations. When this has been done, the list is as shown in Table 2.

| TABLE 1 | TABLE 2 | TABLE 3 |
|---|---|---|
| *1 | *1, 10 v. | *1, 10 v. |
| 2 | 2 | ② |
| 3 | 3 | 3 |
| 4 | 4 | ④ |
| 5 | 5 | 5 |
| *6 | *6, 20 v. | *⑥, 20 v. |
| 7 | 7 | 7 |
| 8 | 8 | 8 |
| 9 | 9 | 9 |
| 10 | 10 | 10 |
| *11 | *11, 30 v. | *11, 30 v. |
| 12 | 12 | 12 |
| 13 | 13 | 13 |
| 14 | 14 | 14 |
| 15 | 15 | 15 |
| *16 | *16, 40 v. | *⑯, 40 v. |
| 17 | 17 | 17 |
| 18 | 18 | ⑱ |
| 19 | 19 | 19 |
| 20 | 20 | 20 |
| *21 | *21, 50 v. | *21, 50 v. |
| 22 | 22 | ㉒ |
| 23 | 23 | 23 |
| 24 | 24 | 24 |
| etc. | etc. | etc. |
| 40 | 40 | 40 |
| *41 | *41, 90 v. | *㊶, 90 v. |
| 42 | 42 | 42 |
| 43 | 43 | 43 |
| 44 | 44 | 44 |
| 45 | 45 | 45 |
| *46 | *46, 100 v. | *㊻, 100 v. |

The operator then marks those numbers on the list corresponding to scale graduations at which calibration of the instrument is to be carried out. In the present example, the voltmeter reads up to 100 volts and calibration is carried out at the following scale graduations: 12, 16, 20, 40, 44, 52, 90, 94, 100 volts. Table 3 shows the numbers in the list corresponding to these scale graduations distinguished by being ringed.

From the information in Table 3 is prepared a computer program, e.g. on punched tape, which embodies all the information needed by the computer to actuate the calibration procedure. The essential part of the program is the sequence of ringed numbers in Table 3, but other computer instructions are included. In the present example the program would read as follows: "D.V.S.: S: 100 v.: 50 c./s.: P.O.: D: 2, 4, 6, 16, 18, 22, 41, 43, 46: Name of client: order number: test certificate number: date: serial number of instrument: description of instrument: P.T.S."

In this program the symbols have the following significance:

| Symbol: | Meaning |
|---|---|
| D.V.S. | Use digital voltmeter as standard instrument. |
| S | The following information relates to supplies. |
| 100 v. | Voltage supplies must be selected: maximum adjustment must be 5% in excess of 100 v. This instruction also selects the voltage ranges on the digital voltmeter. |
| 50 c./s. | A.C. suppplies of 50 c./s. frequency must be used and a rectifier auxiliary must be connected to the digital voltmeter. |
| D.S. | Down-scale calibration-checks are required. |
| P.O. | Print out results as they become available. (This enables gross errors to be detected and the calibration-check to be stopped). |
| D. | Data. |
| P.T.S. | Print test certificate. |

The sequence of numbers following the instruction D informs the computer which scale markings are to be tested.

The calibration-check is now carried out by placing the program in the tape reader of the computer and operating a third switch. The information on the tape is then stored in the computer which exercises control over the calibration according to the instructions stored.

Under the control of the computer the turntable carrying the instrument (having been returned to its initial position with zero of the scale at the datum line) will rotate, the passage of each graduation produces a scale signal which is counted by the computer and when the scale division corresponding to the first calibration number comes within the vicinity of the datum, an instruction is given to bring an analogue servo system into operation. This servo system consists of the two photo-sensitive elements 45, 46 which are differentially connected and feed and split field motor 9 through amplifiers of conventional type. The servo system acts to cause the two photo-sensitive elements to be equally illuminated and this occurs when the image of the required scale division is accurately centered on the datum line. A command is then given to energise the magnetic brake which holds the turntable to keep the instrument in this position.

Application of the brake initiates a request to the computer to raise the voltage supplied to the instrument slowly from zero until the pointer is sensed by the photo-sensitive elements 39, 40 which are also differentially connected. From this moment the pair of photo-sensitive elements 39, 40 control the voltage supplied, and when equality of illumination between the two is achieved, a pointer output signal is generated which is arranged to hold the voltage steady for a period of one second by way of example at the level then reached.

The photo-sensitive elements 39, 40 and the computer continue to monitor the position of the pointer during this second and if the levels of illumination of the two photo-sensitive elements do not deviate from equality by more than a predecided amount during this second a command is given to record the reading of the digital voltmeter and to print out the voltage reading given on it.

The command to record the voltage initiates a command to de-energise the magnetic brake and rotate the turntable 8 until the scale marking corresponding to the next calibration number comes within the vicinity of the datum line. Control is then again passed to the photo-sensitive elements 45, 46 and the turntable is brought to a stop with the required scale markings on the datum line. The voltage is once more brought up until the pointer is sensed by the photo-sensitive elements 39, 40 and the procedure described above follows once more until all the calibration-checks required have been carried out.

For downscale readings, the procedure is then followed in reverse. The computer is arranged to compare the accurate value of the voltage recorded for each calibration point with the voltage corresponding to the scale marking for that point and if the two do not deviate from equality by more than a predecided amount in each case then the computer will print a test certificate at the end of the calibration procedure on the instrument tested.

Alternatively, the operator can make the comparison of recorded voltages with voltage indicated on the test instrument and then instruct the computer to print the test certificate if the results are satisfactory.

The calibration-check procedure just described is suitable for the calibration-checking of instruments of low grade accuracy. When calibrating instruments of high grade accuracy, the same procedure will be followed initially except that the test certificate would not be printed. After the initial procedure, an additional part of the program initiates a final accurate calibration-check procedure. The information in the additional program may include (1) instructions as to the test specification to be used, (2) the type of standard instrument to be used in the final calibration, e.g. thermal converter, and (3) the form of test certificate required.

The final calibration-check procedure is basically the same as the initial calibration-check, the turntable being brought to rest with the scale markings corresponding to the successive calibration points on the datum line. When a scale marking corresponding to a particular calibration point is centered on the datum line the voltage is increased to slightly below the value required to centre the point on the datum line. This value is already recorded approximately as a result of the initial calibration-check and the voltage may be switched quickly to a value close to the correct one, using a fine adjustment device only for the final adjustment and thus avoiding excessive wear on the fine adjustment device.

Instructions (1) and (3) listed above call up sub-routines containing for example, information as to the accuracy required at various points of the instrument scale and minimum dead zone requirements taking into account coulomb friction. The comparison of values corresponding to pointer readings and values of the voltage supplied in order to achieve these readings is in this case made by the computer and if the comparison gives a satisfactory result the computer prints out the test certificate.

Instead of having two pairs of photo-sensitive elements 39, 40 and 45, 46 in the photo-sensitive device, a single pair can be arranged to receive the image of the pointer as well as the scale markings, one of these images being blanked off when the other is being sensed. Even a single photo-sensitive element may be arranged to detect both scale graduations and pointer, e.g. with an auxiliary switching device allowing a graduation to be detected first and then the pointer.

The calibration-check procedure can be altered to reduce still further the operations to be performed by the calibrator. For example, the instrument zero may be set automatically by means of a mechanical actuator arranged to rotate a turn-screw engaged with the set-zero screw of the instrument. The actuator is part of a servo system supplied with input signals from a photo-sensitive device responsive to the position of the pointer. During setting, the instrument is vibrated to break down pivot stiction and lessen the effects of coulomb friction.

Further, the apparatus can be adapted to recognise the cardinal graduations of the scale of its own accord. If these graduations are distinguished physically from the other markings of the scale, for example by being longer, the computer can be made to recognize the distinction. Alternatively, the computer can be arranged to print a cardinal point distinguishing mark opposite every $n$th number on the list of Table 1. The number $n$ may be the same over the whole scale of the instrument or it may vary from one end of the scale to the other. This can be taken account of in programming the computer.

In order to make the preparation of the instruction program still more completely automatic, the computer can be primed with information as to the calibration points to enable it to print the distinguishing marks such as the rings of the list of Table 3 and if the list of Table 3 is not required to be printed out the computer can be arranged to prepare the instruction program directly on punched tape.

In deciding on the best division of labour between the computer and the operator account is taken of the ergonomic factors involved in order to ensure that the operations required of the operator are not such as to cause undue fatigue or to demand too great skill. At the same time, the operations must not be so routine as to destroy the interest of the operator and thus put the accuracy of the calibration-check at risk in this way.

In the procedure described above, the input voltage fed to the instrument under test is adjusted to bring the instrument pointer to a reading corresponding to a predecided value of the voltage. A comparison is then made between the actual input voltage and the voltage corresponding to the reading of the instrument in order to determine the accuracy of the instrument. An alternative procedure is to feed an accurately known voltage into the instrument and then to determine the value of the voltage indicated by the pointer reading. In the case of a pointer reading instrument, the pointer reading may be determined by means of a movably mounted photo-sensitive device which seeks the pointer and produces a reading dependent on its position e.g. by means of an angle to digit transducer, and a computer can be arranged to read the transducer indication.

What I claim is:

1. Apparatus for the calibration of a measuring instrument in which a pointer moves over a graduated scale when a stimulus to be measured is applied to the instrument, which apparatus comprises an optical system having an optical axis, driving means for producing relative controlled movement in the direction of the scale between the instrument being calibrated and the axis of the optical system, the optical system being provided with a photo-sensitive device having an element which is arranged to be sensitive to light within a narrow confined area symmetrically positioned about the optical axis and upon which light from the scale and from the pointer can fall so that a graduation or a pointer output signal from the photo-sensitive device is produced when respectively a scale graduation or the pointer passes through the position in which it is symmetrically disposed about the optical axis, and controlling means for:

(a) controlling said driving means from the photo-sensitive device to stop the relative movement between the instrument being calibrated and the optical system of the apparatus when a predecided number of scale output signals have been generated.

(b) varying the stimulus applied to the instrument until the photo-sensitive device produces a pointer output signal as a result of the pointer being symmetrically disposed about the optical axis, and (c) measuring or recording the magnitude of the stimulus when said pointer output signal is produced.

2. Apparatus according to claim 1 in which the controlling means is arranged to stop the relative movement between the instrument being calibrated and the optical system of the apparatus during a predetermined dwell period when each of a predecided series of scale graduations is symmetrically disposed about the optical axis.

3. Apparatus according to claim 1 in which the controlling means of the apparatus embodies a computer.

4. Apparatus according to claim 3 for determining the reading of the instrument when a predecided precisely known value of the stimulus is applied, in which the controlling means of the calibrating apparatus are replaced by controlling means for:
  (d) applying a known value of the stimulus to the instrument until the photo-sensitive device produces a pointer output signal as a result of the pointer being symmetrically disposed about the optical axis,
  (e) controlling said driving means to stop the relative movement between the instrument being calibrated and the optical system of the apparatus when the pointer is symmetrically disposed about the optical axis, and
  (f) measuring or recording the scale reading of the instrument by counting the number of scale output signals produced by the photo-sensitive device before the pointer output signal is produced.

5. Apparatus according to claim 1 in which the photo-sensitive device has a pair of adjacent photo-sensitive elements symmetrically disposed about the optical axis so that a well defined signal can be derived from the differential output of the pair of photo-sensitive elements when a scale graduation of the instrument to be calibrated or the instrument pointer is symmetrically disposed about the optical axis.

6. Apparatus according to claim 5 in which the pair of photo-sensitive elements is arranged to be responsive only to the graduations on the instrument scale and the photo-sensitive device is provided with a second pair of photo-sensitive element symmetrically disposed about the optical axis and responsive only to the pointer of the instrument.

7. Apparatus according to claim 1, adapted for the calibration of circular scale instruments, comprising means for rotating the instrument about an axis through the centre of the scale, said scale being intersected by the axis of the optical system.

8. Apparatus according to claim 1 in which the portion of the image of the instrument scale projected onto the element or elements of the photo-sensitive device is restricted by apertured masks close to the photo-sensitive device to a width approximately twice that of a scale graduation or pointer.

9. Apparatus according to claim 8 in which the optical system includes beam splitting means whereby an image of the instrument scale can be projected onto a viewing screen.

10. Apparatus according to claim 9 comprising additional masks of the same general pattern coacting with the viewing screen and defining by areas having a greater degree of transparency than the remainder of the mask a restricted image as presented to the photo-sensitive device.

11. A process for calibrating, by means of a calibration apparatus as set forth in claim 1, a measuring instrument in which a pointer moves over a graduated scale when a stimulus to be measured is applied to the instrument, comprising preparing from a selection of scale graduation of the measuring instrument a computer program which can program a computer to actuate the instrument calibration apparatus to record the stimulus required to bring the instrument pointer to each of the selected instrument scale graduations.

12. A process according to claim 11 in which an initial record is made of the selected instrument scale graduations from which the computer program is prepared.

13. A process according to claim 12 in which the instrument to be calibrated is mounted on and progressively moved relative to the instrument calibration apparatus, causing a record to be made at the passage of each instrument scale graduation while a human operator causes a further indication to be made on the initial record at the passage of each graduation selected for calibration.

References Cited
UNITED STATES PATENTS

| | | | |
|---|---|---|---|
| 2,275,977 | 4/1942 | Means. | |
| 2,767,375 | 10/1956 | Schramm. | |
| 3,349,325 | 10/1967 | Bajars | 324—74 |
| 3,409,829 | 11/1968 | Elmore | 324—74 |

S. CLEMENT SWISHER, Primary Examiner

U.S. Cl. X.R.
324—74